United States Patent
Traut et al.

(10) Patent No.: US 7,313,512 B1
(45) Date of Patent: Dec. 25, 2007

(54) SOFTWARE LICENSE ENFORCEMENT MECHANISM FOR AN EMULATED COMPUTING ENVIRONMENT

(75) Inventors: Eric P. Traut, San Carlos, CA (US); René A. Vega, Scotts Valley, CA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 10/274,298

(22) Filed: Oct. 18, 2002

(51) Int. Cl.
*G06F 9/455* (2006.01)
*G06F 9/45* (2006.01)
*G06F 7/04* (2006.01)

(52) U.S. Cl. ............................ 703/23; 717/138; 726/26

(58) Field of Classification Search ................... 726/27, 726/35, 31, 26; 703/22, 23; 705/59; 718/1; 717/168, 138
See application file for complete search history.

(56) References Cited

U.S. PATENT DOCUMENTS

| | | | | |
|---|---|---|---|---|
| 5,790,664 A | * | 8/1998 | Coley et al. ................. | 709/203 |
| 6,056,786 A | * | 5/2000 | Rivera et al. ................ | 717/168 |
| 6,980,946 B2 | * | 12/2005 | Giles et al. .................... | 703/22 |
| 2001/0013064 A1 | * | 8/2001 | Cox et al. ..................... | 709/220 |
| 2002/0056076 A1 | * | 5/2002 | van der Made .............. | 717/129 |

* cited by examiner

*Primary Examiner*—Anthony Knight
*Assistant Examiner*—Tom Stevens
(74) *Attorney, Agent, or Firm*—Woodcock Washburn LLP

(57) ABSTRACT

In an emulated computing environment, a method is provided for licensing software of one or more guest computer systems. A license key server is provided in the host computer system for monitoring the initiation of unlicensed software, including operating system software, in the guest computer system. A determination is made by the license key server as to whether additional a license is available for each unlicensed software application. If a license is available, a license is granted and the count of available licenses is decremented. If a license is not available, a license is not granted and the unlicensed software application in the guest computer system is disabled.

20 Claims, 4 Drawing Sheets

SOFTWARE LICENSE ENFORCEMENT MECHANISM FOR AN EMULATED COMPUTING ENVIRONMENT

TECHNICAL FIELD OF THE INVENTION

The present invention relates in general to the field of computer system emulation and, more particularly, to a method for monitoring and enforcing software license restrictions in an emulated computing environment.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will seek to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software designed for its own hardware architecture and software written for computers having an unrelated hardware architecture. As a more specific example, a computer system manufactured by Apple Computer, for example, may run operating systems and programs written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation of the operation of the hardware architecture of the emulated guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulation program executing on the operating system software and hardware architecture of the host computer, such as a computer system having a PowerPC processor, mimics the operation of the entire guest computer system. The emulation program acts as the interchange between the hardware architecture of the host machine and the instructions transmitted by the software running within the emulated environment. The emulation program is sometimes referred to as a virtual machine monitor.

Multiple virtual machines can be established on a single host machine. In this scenario, a host machine of a certain processor family may host several virtual machines of the same processor family. In this computing environment, each virtual machine operates as its own stand-alone computer system, allowing a user to install separate operating systems or multiple instances of a single operating system on one or more of the virtual machines. Because each virtual machine is independent of all other virtual machines and the host machine, software running within one virtual machine has no effect on the operation of any other virtual machines or the underlying host machine. An emulated computing environment can therefore support a number of operating systems, including an array of related operating systems or multiple, concurrent instances of the same operating system, on a single host computer system.

In this emulated computing environment, a user may run multiple virtualized computer systems on a single physical computer system, eliminating the need for multiple hardware systems to support multiple computer systems. As an alternative to purchasing and configuring an additional physical computer system, an additional virtual machine may be established on an existing computer system. Running multiple, independent virtual machines on a single physical host machine provides, among other benefits, the ability to test software applications across multiple computing environments and support legacy software applications or operating systems. Running multiple virtual machines on a single host machine also results in a cost savings in that the number of physical machines and their corresponding maintenance costs are reduced. Running multiple virtual machines on a single host machines also provides the benefit of operating system and application software isolation. Because each virtual machine is operationally isolated from the host operating system and every other virtual machine, an operational failure or hang in the operating system or application software of one virtual machine will not effect the operational status of another virtual machine. Because of the operational isolation of each virtual machine, the activities of an enterprise may be consolidated in each of the virtual machines. For example, a database application may be located in one of the virtual machines, and an e-mail server may be located in another.

The current scheme for licensing of operating system software, however, assumes that each physical computer system will include a single operating system. This licensing scheme and the software mechanism for enforcing this licensing scheme does not fit the circumstance in which multiple, concurrent operating systems may exist as part of multiple virtual machines operating on a single physical host machine.

SUMMARY OF THE INVENTION

The present invention concerns a method and system for licensing software that is resident in an emulated computer system. A computer system may include a host computer system and one or more emulated computer systems, or virtual machines. As each virtual machine is initiated, the operating system of the virtual machine performs an action that indicates to an emulation program or the host computer system that the operating system of the virtual machine is performing its functions within a virtual machine. Once an unlicensed operating system has been identified in a virtual machine, the key server of the host computer system grants a license to the unlicensed operating system of the guest computer system. The host computer system decrements its count of licensed guest operating systems. The key server of the host computer system will periodically query the virtual machines to determine if each operating system has been licensed by the key server or if an operating system has terminated. When a licensed operating system of a virtual machine is terminated, the count of licensable guest operating systems may be incremented. Communication between the host computer system and the guest computer systems may be encrypted to prevent the theft of license codes.

The software license enforcement method disclosed herein is advantageous in that it provides a method for licensing operating systems that exist in virtual machines that reside on a host computer system. The licensing technique is secure and does not compromise the self-transparency of the guest computer system. The software licensing technique disclosed herein is also advantageous in that it provides a method for licensing multiples of a single operating system in a single computer system. Because the licensing technique disclosed herein involves the use of a closely monitored count of licensable operating systems, the number of licensable operating systems may be appropriately limited. Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
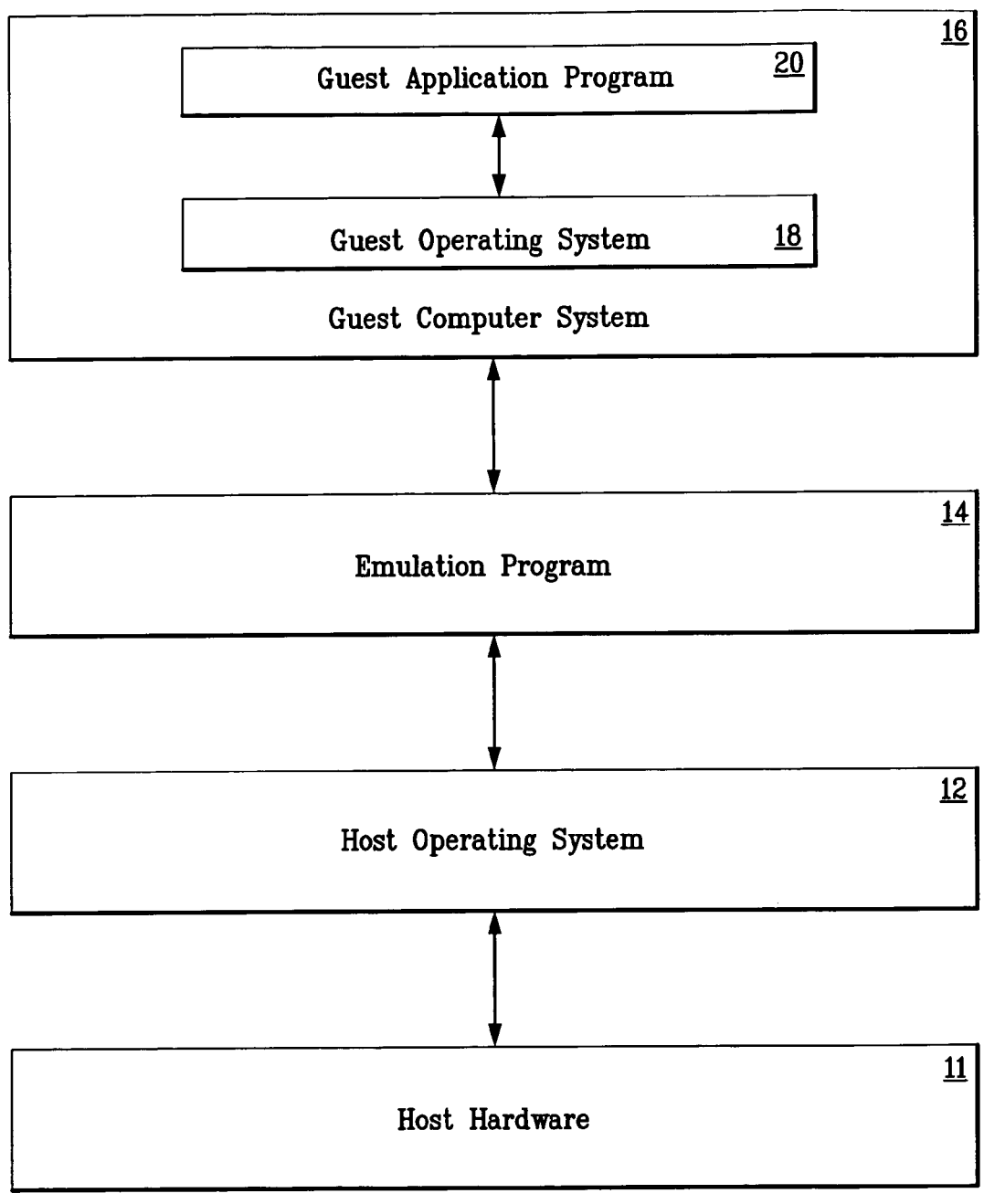
FIG. 1 is a diagram of the logical layers of the hardware and software architecture for an emulated operating environment in a computer system.

The present invention provides a system and method for the licensing of operating system software in an emulated computing environment. Shown in FIG. 1 is an example of the logical layers of the hardware and software architecture for an emulated operating environment in a computer system, which is indicated generally at 10. An emulation program 14 runs on a host operating system that executes on the host computer system hardware or processor 11. Emulation program 14 emulates a guest computer system 16, which includes a guest operating system 18. Guest application programs are able to execute on guest operating system 18. In the emulated operating environment of FIG. 1, because of the operation of emulation program 14, guest application 20 can run on the computer system 10 even though guest application 20 may be designed to run on an operating system that is generally incompatible with host operating system 12 and host computer system hardware 11. As an alternative, guest operating system 20 may be the same as or a variation of host operating system 12. In the architecture of FIG. 1, guest computer system 16 operates as a virtual machine that runs independently of the host operating system 12 and the host computer system hardware 11.

Figure 2:
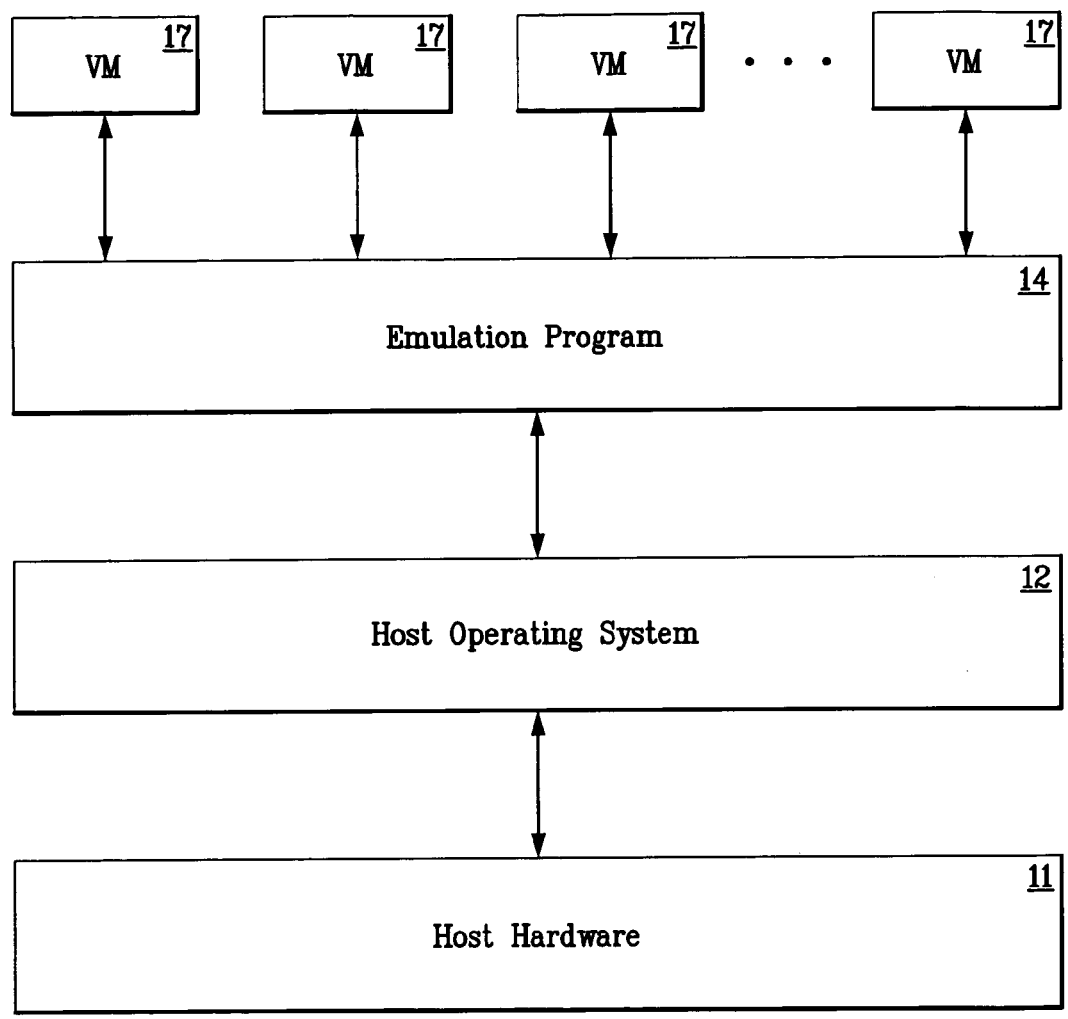
FIG. 2 is a diagram of the logical layers of the hardware and software architecture of a computer system that includes multiple virtual machines.

Shown in FIG. 2 is an example of the logical layers of the hardware and software architecture of a computer system 10 that includes multiple virtual machines 17. Each virtual machine 17 includes a guest operating system 18, and each virtual machine 17 is supported by an emulation program 14. The same operating system may be installed in each virtual machine 17. As an example, host operating system 12 may be Microsoft Windows XP™, and the operating system of each of the virtual machines may be Microsoft Windows NT™. Alternatively, variations of a single operating system may be installed across each of the virtual machines 17. As an example of this environment, host operating system 12 may be Microsoft Windows XP™, while one or more of the virtual machines runs one of the following operating systems: Windows 3.x™, Windows 95™, Windows 98™, Windows Me™, Windows NT™, Windows 2000™, MS-DOS™, Linux, BSD, OS/2™, or Novell Netware™, among other possible operating systems. Each virtual machine 17 is operationally independent of the host operating system and the other virtual machines. An operational failure in one of the virtual machines will not affect the operation of the host operating system or the other virtual machines.

Many modern operating systems employ a technique for managing peripheral devices known as plug and play. In a plug and play operating system, the operating system during a boot or initiation sequence enumerates the peripheral devices coupled to the computer system. For each peripheral device, the operating system determines whether a driver has been installed for the peripheral device. If a driver has not been installed for a peripheral device located by the operating system, the operating system locates and installs a driver for the peripheral device.

Figure 3:
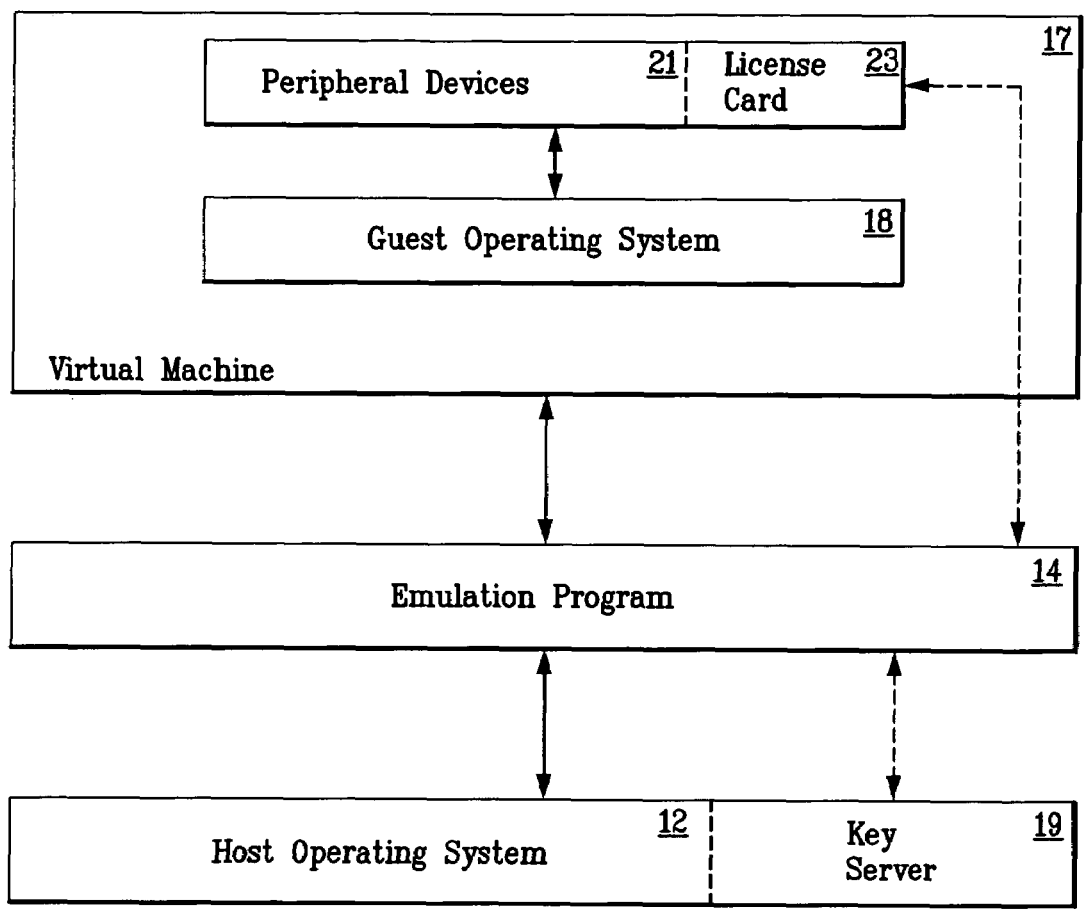
FIG. 3 is a diagram of the logical layers of the hardware and software architecture of a computer system that includes a license card and a key server.

The present invention involves the placement of an emulated hardware device, known as a license card, in each virtual machine. Shown in FIG. 3 is virtual machine 17. Guest operating system 18 communicates with a group of peripheral devices 21, including a license card 23. From the perspective of guest operating system 18, license card 23 appears to be similar to any other peripheral device that is controlled through a software driver. Upon recognizing the presence of license card 23 during the initiation or boot phase, guest operating system 18 determines if the associated driver for license card 23 is installed. If the associated driver for license card 23 has not been installed, guest operating system 18 attempts to retrieve and install the associated software driver. License card 23 is an emulated hardware device that does not have a physical analog in a computer system.

The placement of a license card in each virtual machine has the effect of forcing the guest operating system to take an action that indicates that the guest operating system is not the host operating system. The guest operating system operates such that the guest operating system is self-transparent; i.e., the guest operating system believes that it is the sole operating system of the computer system and has exclusive control over the hardware of the computer system. The placement of a license card in each guest operating system causes the guest operating system to take some action that confirms that the operating system at issue is in fact a guest operating system, without also causing the same guest operating system to lose its self-transparency feature. Other techniques may be used to confirm whether the operating system at issue is a guest operating system, without causing a corresponding loss in the self-transparency of the operating system. One such technique involves causing the guest operating system to execute an instruction that is handled differently in an emulated environment as compared to a non-emulated environment. As an example, at boot time, the operating system may issue an instruction as part of the boot sequence that causes an exception upon its attempted execution in a non-emulated computing environment. If the same instruction is issued in a virtual machine environment, the instruction is executed. In this manner, the guest operating system takes an action that confirms that the operating system is in fact a guest operating system, without a loss in the self-transparency of the guest operating system.

Emulation program 14 monitors the itemization of plug and play devices by each of the guest operating systems 18. When a guest operating system 18 recognizes license card 23 as a peripheral device, emulation program 14 communicates with host operating system 12 to request a license key from key server 19 within host operating system 12. The function of key server 19 is to monitor and enforce the software license restrictions on the operating system software used in the virtual machines. Key server 19 includes a count of the number of licensed guest operating systems that may be operating simultaneously in the virtual machines of the computer system. The number of licensed guest operating systems may be one, two, six, or more, depending on the license rights purchased by the computer user.

Figure 4:
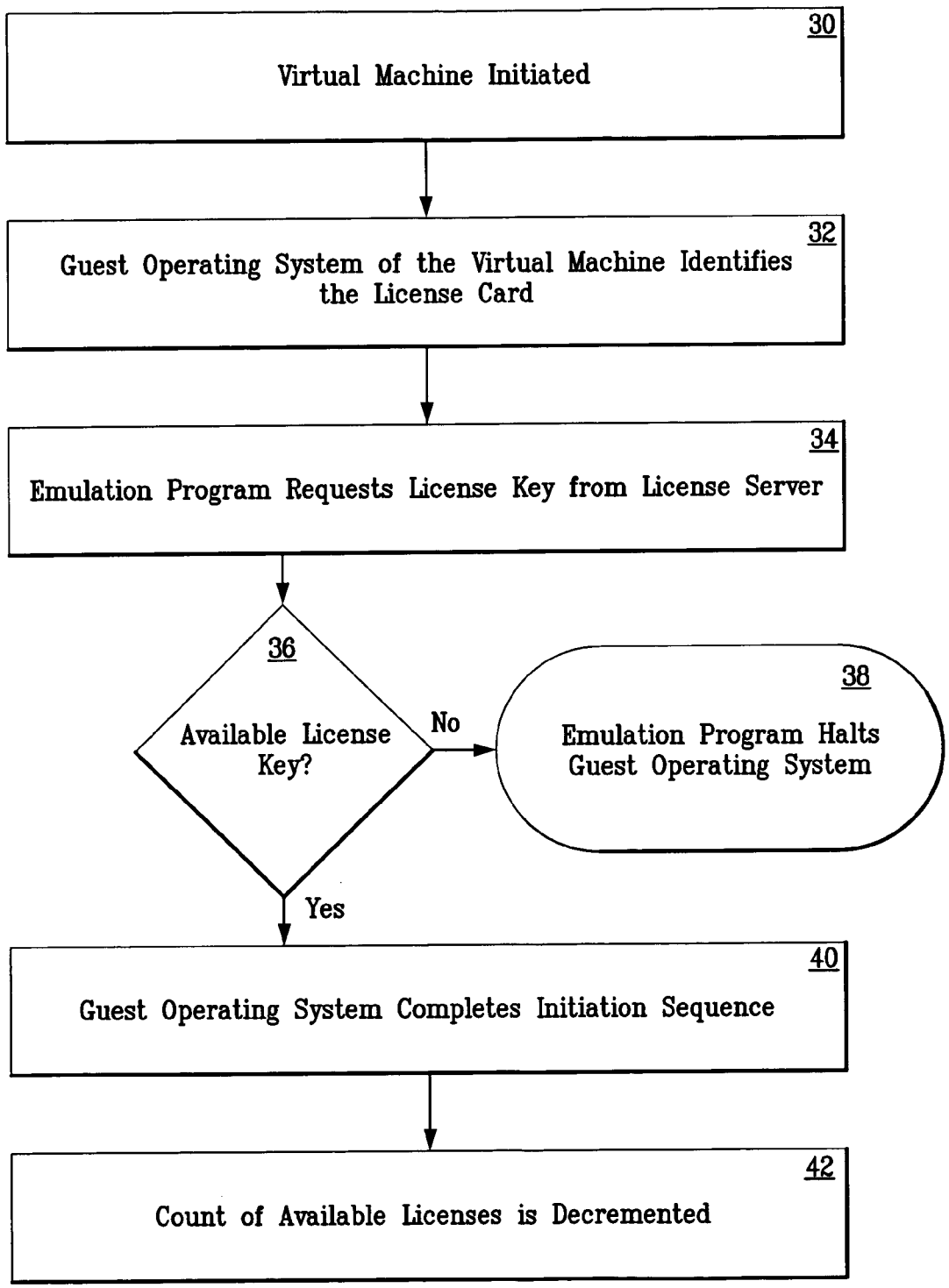
FIG. 4 is a flow diagram of the steps for initiating and licensing the operating system software of a virtual machine.

As shown in FIG. 4, during the initiation sequence for a virtual machine (step 30), a guest operating system identifies a license card (step 32). Emulation program 14 communicates with key server 19 to request a license key from the key server (step 34). If key server 19 determines that an additional operating system license is available for the guest operating system (step 36), key server 19 passes a key or some other authorization code to the emulation program, which permits the guest operating system to continue boot up (step 40). Key server 19 would then decrement its count of available guest operating system licenses or keys 9 (step 42). At this point, the licensed guest operating system is said to have consumed a key from the key server. Once the count of available guest operating system licenses reaches zero, no additional keys or authorizations are issued by key server 19. As an example, if the count of available guest operating systems is zero, and if emulation program 14 requested a licenser key from key server 19, key server 19 would notify emulation program 14 that no additional guest operating system licenses are available. Emulation program 14 would then interrupt the boot sequence of the virtual machine and prevent the operating system software of the associated virtual machine from running (step 38). Key server 19 maintains a record of the licensed guest operating systems. If a licensed guest operating system is terminated, the emulation program notifies the key server, which increments the count of available guest operating systems. The termination of a licensed guest operating system has the effect of returning a key to the key server.

The transfer of the license key from key server 19 to each virtual machine is accomplished in a secure transport medium. As part of the key transfer process, the operating system vendor may seek to transfer encrypted handshaking signals to the guest operating system to confirm that the guest operating system is a licensable version of the host operating system. Communications to and from the guest operating system can be accomplished through an emulated hardware device, such as the license card 23. License card 23 would communicate the encrypted signals to emulation program 14, which could pass the encrypted signals to the key server 19 of the host operating system. The logical relationship of license card 23, emulation program 14, and key server 19 are shown in FIG. 3. Alternatively, the host operating system and the guest operating systems could communicate encrypted signals through the hardware abstraction layer of the computer system.

Key server 19 will perform periodic queries of each of the virtual machines to confirm the licensing status of each of the operating system software of the virtual machines. The periodic license checks confirm that the operating system of each virtual machine was licensed by key server 19 and that none of the virtual machines have stalled or timed out. If it is determined that any of the guest operating systems were not licensed by key server 19, key server 19 will determine if a license is available for the unlicensed guest operating system, i.e., whether the count of available guest operating system licenses is greater than zero. If an unlicensed guest operating system is detected, and if additional license keys are available, he count of available licenses will be decremented and the unlicensed guest operating system will be licensed by key server 19. If an unlicensed guest operating system is detected, and if no additional license keys are available, the unlicensed guest operating system will be halted or terminated.

Unlicensed guest operating systems may exist because of the ability to migrate halted virtual machines between computer systems. Because of this ability, a virtual machine may be initiated and licensed for use on a computer system with available license keys. This virtual machine may then be halted and migrated to another computer system with no available license keys. The periodic querying of the virtual machines by the key server will detect this migrated virtual machine, resulting either in the licensing of the migrated virtual machine in the destination computer system or the termination of the migrated virtual machine in the destination computer system.

The present invention is not limited in its application to the emulation of a particular computer system architecture, particularly the Intel 80X86 architecture. Rather, the emulation technique disclosed herein is applicable any time it is desirable license multiple instances of software in a virtual or emulated computing environment. It should also be understood that the present invention is not limited to the licensing of operating system software. The techniques described herein may be used to establish a licensing protocol for application software in a virtual or emulated computing environment. It should be also understood that the use of the present invention is not limited to those computing environments in which the host operating system and the licensed operating system are identical. The techniques of the present invention could be employed in those instances in which the host operating system and the guest operating systems are variants within the same family of operating systems. Alternatively, the host operating systems and one or more of the guest operating systems could be operating systems associated with different hardware platforms.

Although the present invention has been described in detail, it should be understood that various changes, substitutions, and alterations can be made thereto without departing from the spirit and scope of the invention as defined by the appended claims.

What is claimed is:

1. A method for licensing software in an emulated computing environment, the emulated computing environment comprising one or more emulated computer systems being supported by a host computer system, the method comprising:
   providing a limited number of software licenses to be consumed by unlicensed software in the emulated computer systems;
   identifying the presence of an unlicensed software program in an emulated computer system by an emulated peripheral device that communicates with a key server of the host computer;
   determining at the key server in the host computer system whether an unconsumed software license exists for the unlicensed software in the emulated computer system;
   granting a license to the unlicensed software program in the emulated computer system if it is determined that an unconsumed software license does exist; and
   disabling the operation of the unlicensed software program in the emulated computer system if it is determined that an unconsumed software license does not exist.

2. The method for licensing software in an emulated computing environment of claim 1, wherein the unlicensed software in the emulated computer system is the operating system software of the emulated computer system.

3. The method for licensing software in an emulated computing environment of claim 2, wherein the step of identifying the presence of an unlicensed software program in an emulated computer system comprises the step of identifying the presence of an unlicensed operating system in the emulated computer system without compromising the self-transparency of the unlicensed operating system in the emulated computer system.

4. The method for licensing software in an emulated computing environment of claim 3, wherein the step of identifying the presence of an unlicensed software program in an emulated computer system comprises the step of monitoring the action of the operating system software of the emulated computer system to determine if the guest operating system identifies during an initiation sequence the emulated peripheral device in the emulated computer system, wherein the emulated peripheral device is without a physical analog and requires that the guest operating system communicate with the emulated peripheral device through a device driver in the guest operating system.

5. The method for licensing software in an emulated computing environment of claim 3, wherein the step of identifying the presence of an unlicensed software program in an emulated computer system comprises the step of monitoring the action of the operating system software of the emulated computer system to determine if the emulated computer system executes a certain instruction, wherein the emulated computer system will execute the certain instruction and wherein the host computer system will cause an exception to occur in the event of the attempted execution of the certain instruction.

6. The method for licensing software in an emulated computing environment of claim 2, further comprising the step of maintaining in the host computer system a count of the remaining available licenses for unlicensed software in the emulated computer systems.

7. The method for licensing software in an emulated computing environment of claim 6, wherein the step of granting a license to the unlicensed software program in the emulated computer system comprises the step of decrementing the count of available licenses for unlicensed software in the emulated computer systems.

8. The method for licensing software in an emulated computing environment of claim 6, wherein the step of disabling the operation of the unlicensed software program in the emulated computer system if it is determined that an unconsumed software license does exist comprises the step of disabling the operation of the unlicensed software program in the emulated computer system if the count of available licenses for unlicensed software in the emulated computer system is zero.

9. The method for licensing software in an emulated computing environment of claim 6, further comprising the steps of,
   monitoring the operational status of the emulated computer systems; and
   incrementing the count of available licenses for unlicensed software in the emulated computer systems if it is determined that a previously licensed software program has terminated.

10. The method for licensing software in an emulated computing environment of claim 9, wherein the step of monitoring the operational status of the emulated computer systems comprises the step of receiving periodic communications from each previously licensed software program to confirm that each previously licensed software program remains operational.

11. A method for licensing software in an emulated computing environment that includes at least one emulated computer system, the at least one emulated computer system having software associated therewith, the method comprising:
   identifying an emulated computer system, the emulated computer system comprising an emulated peripheral device that initiates a request for a license;

if an unconsumed license exists for the software associated with the emulated computer system, granting the license to the software; and if the unconsumed license does not exist for the software associated with the emulated computer system, disabling the operation of the software.

12. The method for licensing software in an emulated computing environment of claim 11, wherein the step of identifying an emulated computer system comprises the step of recognizing that the emulated computer system has performed an operation that is characteristic of an emulated computer system.

13. The method for licensing software in an emulated computing environment of claim 12, wherein the step of identifying an emulated computer system comprises the step of recognizing that the operating system of the emulated computer system has identified a peripheral device that is not present in non-emulated computer systems.

14. The method for licensing software in an emulated computing environment of claim 12, wherein the step of identifying an emulated computer system comprises the step of recognizing that the emulated computer system has executed a specified instruction in a specified manner.

15. The method for licensing software in an emulated computing environment of claim 11, wherein the software associated with the emulated computer system is the operating system software for the emulated computer system.

16. The method for licensing software in an emulated computing environment of claim 11, wherein the step of identifying an emulated computer system comprises the step of recognizing that an emulated computer system exists without compromising the self-transparency of the emulated computer system.

17. A method for licensing software in an emulated computing environment, the emulated computing environment comprising at least one virtual machine being supported by a host computer system, wherein each virtual machine includes operating system software, the method comprising:

providing a limited number of software licenses to be consumed by operating system software associated with the virtual machines;

identifying a virtual machine having unlicensed operating system software, the virtual machine comprising an emulated peripheral device that initiates a request for a license;

determining in the host computer system whether an unconsumed software license exists for the operating system software of the virtual machine;

granting a license to the operating system software of the virtual machine if it is determined that an unconsumed software license does exist; and disabling the operation of the operating system software of the virtual machine if it is determined that an unconsumed software license does not exist.

18. The method for licensing software in an emulated computing environment of claim 17, wherein the step of identifying a virtual machine having unlicensed operating system software comprises the step of identifying a virtual machine without compromising the self-transparency of the virtual machine.

19. The method for licensing software in an emulated computing environment of claim 17, wherein the step of determining in the host computer system whether an unconsumed software license exists for the operating system software of the virtual machine comprises the step of maintaining a count of unconsumed software licenses.

20. The method for licensing software in an emulated computing environment of claim 19, wherein the step of determining in the host computer system whether an unconsumed software license exists for the operating system software of the virtual machine comprises the step of decrementing the count of unconsumed software licenses when a software license is granted to the operating system software of a virtual machine and incrementing the count of unconsumed software licenses when it is determined that a previously licensed operating system software of a virtual machine has ceased operation.

* * * * *